(12) United States Patent
Tsukahara

(10) Patent No.: US 6,803,909 B2
(45) Date of Patent: Oct. 12, 2004

(54) DATA PROCESSING APPARATUS, METHOD, SYSTEM, AND STORAGE MEDIUM

(75) Inventor: Hiroki Tsukahara, Tokyo (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 09/792,330

(22) Filed: Feb. 24, 2001

(65) Prior Publication Data

US 2001/0024230 A1 Sep. 27, 2001

(51) Int. Cl.[7] .............................................. G06T 15/00
(52) U.S. Cl. ..................... 345/419; 345/706; 345/760
(58) Field of Search ................................. 345/419, 420, 345/473, 474, 475, 706, 707, 708, 748, 749, 760

(56) References Cited

U.S. PATENT DOCUMENTS

| | | | | |
|---|---|---|---|---|
| 5,877,759 A | * | 3/1999 | Bauer | 345/339 |
| 5,982,372 A | * | 11/1999 | Brush, II et al. | 345/418 |
| 5,987,480 A | * | 11/1999 | Donohue et al. | 707/501 |
| 6,405,249 B1 | * | 6/2002 | Matsueda et al. | 709/224 |
| 6,414,677 B1 | * | 7/2002 | Robertson et al. | 345/419 |
| 6,487,557 B1 | * | 11/2002 | Nagatomo | 707/102 |
| 6,493,001 B1 | * | 12/2002 | Takagi et al. | 345/759 |

* cited by examiner

Primary Examiner—Almis R. Jankus
(74) Attorney, Agent, or Firm—Bell, Boyd & Lloyd LLC

(57) ABSTRACT

A data processing system including a data processing apparatus having an apparatus having relatively low picture image processing capacity. The system enables such a low-performance data processing apparatus to constantly display homogenous three-dimensional virtual reality spatial picture image. Specifically, a shared server reads VRML contents including a VRML file and a script program via a storage media before generating three-dimensional virtual reality spatial picture image pixel data. The shared server enables the three-dimensional virtual reality spatial picture image pixel data to be transmitted to a client PC from a satellite communication network via a WWW server. The client PC individually displays the received three-dimensional virtual reality spatial picture image pixel data on a monitor.

28 Claims, 6 Drawing Sheets

DATA PROCESSING APPARATUS, METHOD, SYSTEM, AND STORAGE MEDIUM

BACKGROUND OF THE INVENTION

1. Field of the Invention

The present invention relates to a data processing apparatus, a data processing method, a data processing system, and a storage medium. Particularly, the present invention relates to a data processing apparatus and a method of processing data, a data processing system, and a storage medium for allowing a conventional client personal computer (PC) devoid of highly sophisticated functions to display three-dimensional virtual reality spatial image.

2. Description of the Prior Art

Recently, such an art for transmitting a three-dimensional virtual reality spatial image by way of utilizing internet services has been promoted at large. Conventionally, such a three-dimensional virtual reality spatial image is transmitted to a client personal computer from a server as data (such as a VRML file, for example) described via virtual reality modeling language (VRML). Then, by utilizing a specific software and based on the received VRML file, such client personal computer generates pixel data related to the three-dimensional virtual reality spatial picture image and then displays a three-dimensional virtual reality spatial picture image on a monitor.

However, when utilizing the above-mentioned construction, a processing speed for generating pixel data from a VRML file received from a server is dependent on factors such as a CPU processing capacity and a three-dimensional graphics processing circuit of the client personal computer. Because of this, in the case the processing capacity of the above-referred CPU and the three-dimensional graphics processing circuit is insufficient, the pixel data may not be properly generated at real-time conditions. Thus, the client personal computer causes the problem in which the generated three-dimensional virtual reality spatial picture image to have a difference in picture quality.

SUMMARY OF THE INVENTION

The present invention took the above circumstances into consideration so as to provide a data processing apparatus capable of displaying a three-dimensional virtual reality image at real-time. Another object of the present invention is to provide a data processing apparatus capable of generating three-dimensional virtual reality image data to be transmitted to another data processing apparatus on which the transmitted three-dimensional virtual reality image is displayed. Still, another object of the present invention is to provide such a data processing system which enables a server to support picture image processing on the part of a client personal computer by way of enabling the server to execute a process for generating three-dimensional virtual reality spatial picture image data, thus far being executed by the respective client personal computer, whereby enabling an individual client personal computer incorporating different operating functions to display an homogeneous picture image in real-time, three-dimensional virtual reality space.

Such a data processing apparatus according to an embodiment of the present invention provides a three-dimensional virtual reality space for another data processing apparatus linked to a network. This data processing apparatus includes: a generating part for generating pixel data of the three-dimensional virtual reality spatial picture image; and a transmitting part for transmitting the three-dimensional virtual reality spatial pixel data generated by the generating part to the other data processing apparatus.

The present invention includes a method for processing data used by a data processing apparatus, in which the data processing apparatus provides three-dimensional virtual reality space to another data processing apparatus linked to a network. This processing method includes:

a generating step for generating pixel data of the three-dimensional virtual reality spatial picture image; and a transmission controlling step for controlling transmission of the three-dimensional virtual reality spatial pixel data generated via the generating step to the another data processing apparatus.

In addition, a storage medium in accordance with another embodiment of the present invention is provided with a program that can be read by a computer wherein the program is used for controlling a data processing apparatus, such data processing apparatus providing three-dimensional virtual reality space to another data processing apparatus linked via a network. Still, the program includes: a generating step for generating pixel data of the three-dimensional virtual reality spatial picture image; and a transmission controlling part for controlling transmission of the three-dimensional virtual reality spatial picture image generated via the generating step to the another data processing apparatus.

According to another embodiment of the present invention, a data processing apparatus displaying three-dimensional virtual reality spatial picture image is linked to another data processing apparatus via a network. This data processing apparatus includes: a receiving part for receiving pixel data of the three-dimensional virtual reality spatial picture image from the another data processing apparatus; and a displaying part for displaying the pixel data received by the receiving part.

Such data processing apparatus may have a receiving part receiving pixel data of the three-dimensional virtual reality spatial picture image via a satellite communication network.

A method for processing data used by a data processing apparatus displaying three-dimensional virtual reality spatial picture image in accordance with another embodiment is linked with another data processing apparatus via a network. The processing method includes: a reception controlling step for controlling reception of pixel data of the three-dimensional virtual reality spatial picture image from the another data processing apparatus; and a display controlling step for controlling display of the pixel data received via a process for executing the reception controlling step.

A storage medium in accordance with another embodiment of the present invention is recorded with a program that can be read by a computer and such program displaying three-dimensional virtual reality spatial picture image is used for controlling such a data processing apparatus linked with another data processing apparatus via a network. This program includes: a reception controlling step for controlling reception of pixel data of the three-dimensional virtual reality spatial picture image from the other data processing apparatuses; and a display controlling step for controlling display of the pixel data received via a process for executing the reception controlling step.

Further, a data processing system according to another embodiment of the present invention has a first data processing apparatus and a second data processing apparatus, wherein the first data processing apparatus provides a three-dimensional virtual reality space to the second data processing apparatus linked to a network and the second data processing apparatus displays three-dimensional virtual reality spatial picture image, wherein the second data processing apparatus is linked with the first data processing apparatus via a network. Still, the first data processing apparatus includes: a generating part for generating pixel data of three-dimensional virtual reality spatial picture image; and a transmitting part for transmitting the pixel data of the three-dimensional virtual reality spatial picture image generated by the generating means to the second data processing apparatus.

The second data processing apparatus includes: a receiving part for receiving pixel data of the three-dimensional virtual reality spatial picture image from the first data processing apparatus; and a displaying part for displaying the pixel data received via the receiving part.

According to the data processing apparatus, the method of processing data and the storage medium by the first aspect of the present invention, a pixel data of the three-dimensional virtual reality spatial picture image can properly be transmitted and received from other data processing apparatuses and the received pixel data can properly be displayed.

According to the data processing apparatus, the method of processing data and the storage medium by the second aspect of the present invention, the first data processing apparatus generates a pixel data of a three-dimensional virtual reality spatial picture image and then transmits the generated three-dimensional virtual reality spatial pixel data to the second data processing apparatus. The second data processing apparatus receives a pixel data of a three-dimensional virtual reality spatial picture image from the first data processing apparatus and then displays the received pixel data.

Yet, according to the data processing apparatus, the method of processing data and the storage medium a the third aspect of the present invention, it is identified whether the subject for generating a pixel data of a three-dimensional virtual reality spatial picture image should be assigned to the current data processing apparatus or to another data processing apparatus. Then, in response to the identified result, it is arranged to transmit such a file required for generating a three-dimensional virtual reality spatial picture image or a pixel data to other data processing apparatuses.

Still, one of the data processing apparatuses requests for delivery of a practical format of a receivable three-dimensional virtual reality spatial picture image against another data processing apparatus, and then receives such a file necessary for generating the three-dimensional virtual reality spatial picture image in response to the request or it receives a pixel data of the three-dimensional virtual reality spatial picture image. Next, based on the received file, the above data processing apparatus generates a pixel data of the three-dimensional virtual reality spatial picture image, and then displays the pixel data of the received three-dimensional virtual reality spatial picture image or the other pixel data of the generated three-dimensional virtual reality spatial picture image.

Moreover, the first data processing apparatus generates a pixel data of a three-dimensional virtual reality spatial picture image, and then it identifies whether the subject for converting the picture image into a pixel data of the three-dimensional virtual reality spatial picture image should be assigned to the first data processing apparatus itself or to the second data processing apparatus. Next, based on the identified result, the first data processing apparatus transmits such a file necessary for generating the three-dimensional virtual reality spatial picture image or a pixel data to the second data processing apparatus.

On the other hand, the second data processing apparatus requests the first data processing apparatus for delivery of a practical format of the receivable three-dimensional virtual reality spatial picture image. Then, the second data processing apparatus receives such a file necessary for generating the three-dimensional virtual reality spatial picture image or a pixel data of the three-dimensional virtual reality spatial picture image respectively in response to the above request. Next, based on the received file, the second data processing apparatus generates a pixel data of the three-dimensional virtual reality spatial picture image, and finally it displays the pixel data of the received three-dimensional virtual reality spatial picture image or the other pixel data of the generated three-dimensional virtual reality spatial picture image.

The present invention enables the inventive data processing apparatuses capable of receiving a three-dimensional virtual reality spatial picture image and processing a variety of picture images to display homogenous picture images at real-time speed.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
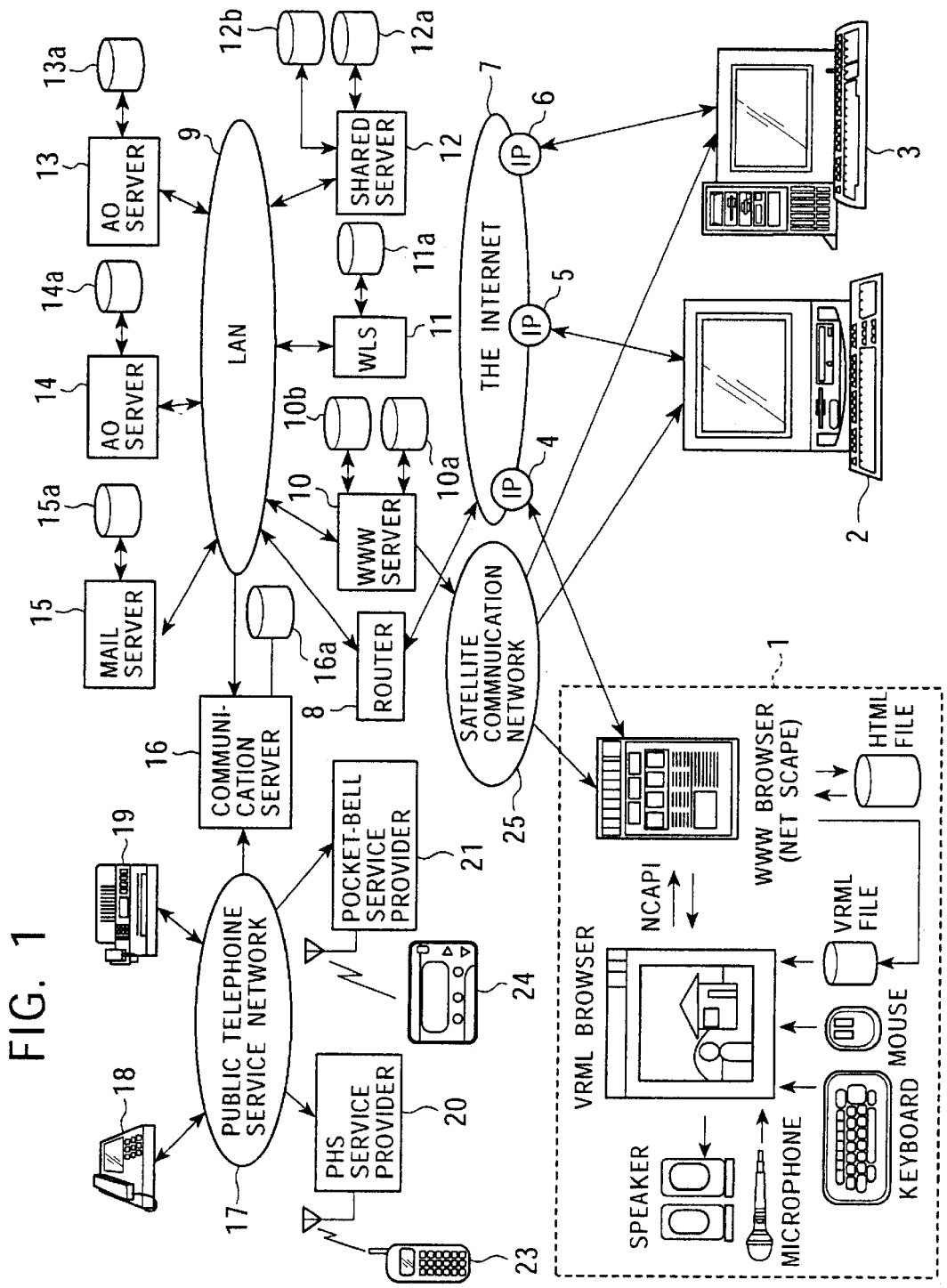
FIG. 1 is an overall schematic block diagram for exemplifying a construction of a three-dimensional virtual reality spatial picture image providing system according to a preferred embodiment of the present invention.

FIG. 1 exemplifies an overall construction of a three-dimensional virtual reality spatial picture image providing system in accordance with an embodiment of the present invention. The illustrated client personal computers(PC's) 1–3 are individually connected to an internet service line 7 (The Internet) via a number of internet-connected service providers 4–6 and have a VRML browser and a worldwide-web (WWW) browser installed therein.

Figure 2:
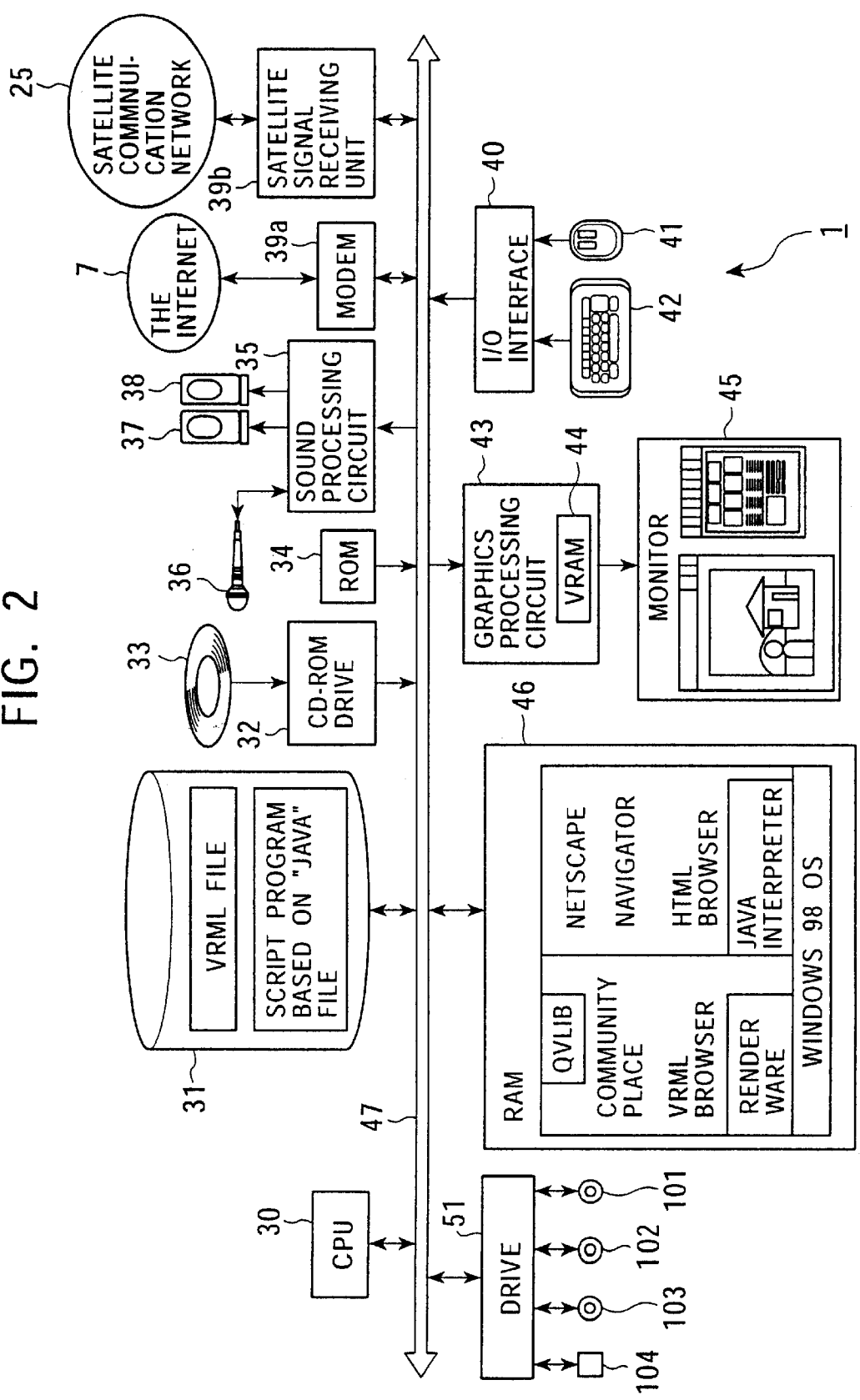
FIG. 2 is an overall schematic block diagram exemplifying a construction of a client personal computer 1 of FIG. 1.

Of the client PC's 1–3 shown in FIG. 1, the client PC 1 is of high performance by way of strengthening performance of a Central Processing Unit 30(CPU 30) and a three-dimensional (3D) graphics processing circuit 43 shown in FIG. 2. This enables the client PC 1 to execute high speed picture image processing.

The high-performance client PC 1 is capable of informing a shared server 12 of a variety of information including its position, periodically or as required. Yet, it is also capable of receiving shared information (VRML file) on other three-dimensional objects, transmitted from the shared server 12 and then displaying the received information.

Further, instead of receiving shared information, it is also possible for the client PC 1 to receive such picture image data previously converted to pixel data from the shared server 12 and then display such pixel data on a monitor 45 or the like shown in FIG. 2. By executing such process, the client PC 1 can eliminate a process of generating picture image data from the shared information.

Further, the client PC 1 is capable of informing the shared server 12 on a variety of information such as its position, periodically or as required, and yet, it is also capable of receiving three-dimensional virtual reality spatial picture image pixel data corresponding to the actual position of the shared server 12 and displaying such received pixel data.

On the other hand, the low-performance client PC's 2 and 3 respectively incorporate a low-performance CPU 30 and a low-performance three-dimensional graphics processing circuit 43 shown in FIG. 2. Each of these client PC's 2 and 3 incorporates a function of only receiving a three-dimensional virtual reality spatial picture image pixel data corresponding to their own positions against the shared server 12 and displaying the received pixel data.

A variety of servers including a WWW server 10, a world-location server (WLS) 11, a shared server 12, application object (AO) servers 13 and 14, a mail server 15, and a communication server 16, are individually connected to a local-area network (LAN) 9 via an internet service line 7 and a router 8. The servers 10–16 are individually provided with hard discs (HDD) 10a, 10b, 11a, 12a, 12b, 13a–16a.

The shared server 12 is provided with information of the above-referred client PC's 1–3 respectively connected thereto via The Internet 7. Based on information on the client PC's 1–3, the shared server 12 identifies an actual capacity of the individual client PC's 1–3 for processing picture image. Consequently, the server 12 transmits a three-dimensional virtual reality spatial picture image to the high-performance client PC 1 as a VRML file. On the other hand, the server 12 performs picture image processing of the VRML file to be provided to the low-performance client PC's 2 and 3 as pixel data. In such occasion, the VRML file is transmitted by the shared server 12 from the WWW server 10 to the client PC 1 via The Internet 7, whereas such picture-image data converted into a pixel data is transmitted to the low-performance client PC's 2 and 3 via a satellite communication network 25 which is capable of transmitting information at high speed. Yet, upon request from the client PC 1, the shared server 12 is also capable of processing picture image of the VRML file for transmission to the client PC 1 not as a VRML file but as a pixel data.

Moreover, the shared server 12 executes operation in accordance with a software for shared servers (Bureau) installed therein. The above-referred AO servers 13 and 14 have a program for communicating with the shared server 12. For example, the AO servers 13 and 14 provide AO's such as a robot and an electronic pet operating autonomously in three-dimensional virtual reality space. Like a 3D client, the AO servers 13 and 14 communicate with the shared server 12 by way of transmitting their information and receiving such shared information related to other 3D objects.

The communication server 16 is connected to a telephone set 18 and a facsimile set 19 via a public-telephone line network 17. Further, the communication server 16 is also wirelessly connected to a PHS terminal apparatus 23 via a personal handy phone system (PHS) service provider 20. Yet, it is also wirelessly connected to a pocket-bell terminal apparatus 24 via a pocket-bell service provider 21.

FIG. 2 exemplifies an overall schematic block diagram of a hardware built in the client PC 1. In the hardware system shown therein, a CPU 30 connected to a main bus line 47 loads a variety of programs including a program recorded on a ROM 34, another program read out from a magnetic disc 101 connected to a drive unit 51, and programs read out from an optical disc 102, an opto-magnetic disc 103, or a semiconductor memory 104, and installed in a hard disc 31, into a RAM 46 in order to execute the programs.

The hard disc 31 stores the VRML file and the VRML contents including predetermined script programs described via a "Java" (a registered trademark of Sun Microsystems Inc., U.S.A.) interpreter. A CD-ROM drive unit 32 reads information including the VRML contents stored in a CD-ROM 33.

A sound processing circuit 35 is connected to a microphone 36 and a pair of speakers 37 and 38 aligned on both sides, which inputs vocal sound from the microphone 36 or outputs music tunes or effect sound from the speakers 37 and 38. A modem 39a and a satellite signal receiving apparatus 39b both constitute communication portions. The modem 39a is connected to The Internet 7 for data communication, whereas the satellite signal receiving apparatus 39b receives satellite signals from a satellite station. An I/O (input/output) interface 40 receives operating signals from a mouse 41 and a keyboard 42. A graphics processing circuit 43 stores picture image data after a variety of processes in a built-in VRAM 44 and displays picture-image data read out from the VRAM 44 on a monitor 45 such as a CRT display, a liquid crystal display and the like.

A "Netscape Navigator" (a registered trademark) which is a WWW browser operating in the "Windows 98" (a registered trademark of Microsoft Inc., U.S.A.), the "Java" interpreter, and a "Community Place Browser", which constitutes a VRML browser developed by Sony Corporation (which is the applicant of the present invention) are for example, read into RAM 46.

The VRML Browser incorporates a "VqLib" which is a library (purser) for interpretation of sentence structure of the VRML, which is disclosed without charge, a "RenderWare" being a software rendering system owned by Criterion Software Ltd. of Great Britain, or any of pursers or rendering systems incorporating such a function equivalent to those specified above.

As shown in FIG. 1, based on the NCAPI (Netscape client application programming interface, a registered trademark of Sony Corporation), the above-referred "Community Place Browser" enables a variety of data to be interchanged with the Netscape Navigator functioning as a WWW browser.

On receipt of an HTML file and a picture image data from a WWW server 10 via The Internet 7, the Netscape navigator stores the picture image data in a local HDD 31. Of these, the Netscape Navigator processes the HTML file and then displays the processed text and picture image on the monitor 45.

On the other hand, when the Community Place Browser receives a picture image data having the VRML contents including a script program based on the VRML file and the "Java", the Community Place Browser processes the VRML file and then causes the VRAM 44 of the graphics processing circuit 43 to store the processed VRML file, and also causes three-dimensional virtual reality space to be displayed on the CTR monitor 45. Further, in response to a result of processing the script program executed by the "Java" interpreter, the Community Place Browser varies behavior of objects within three-dimensional virtual reality space and also varies other display status. If the received picture image data is identified as pixel data, the Community Place Browser causes the VRAM 44 of the graphics processing circuit 43 to store the received pixel data as it is and then displays it on the monitor 45.

Although illustration is not provided, the above-referred low-performance client PC's 2 and 3 are respectively provided with a structure similar to that of the high-performance client PC 1. However, the low-performance client PC's 2 and 3 are respectively devoid of the above-referred VRML browser, including only a function of displaying three-dimensional virtual reality spatial picture image provided as pixel data.

Figure 3:
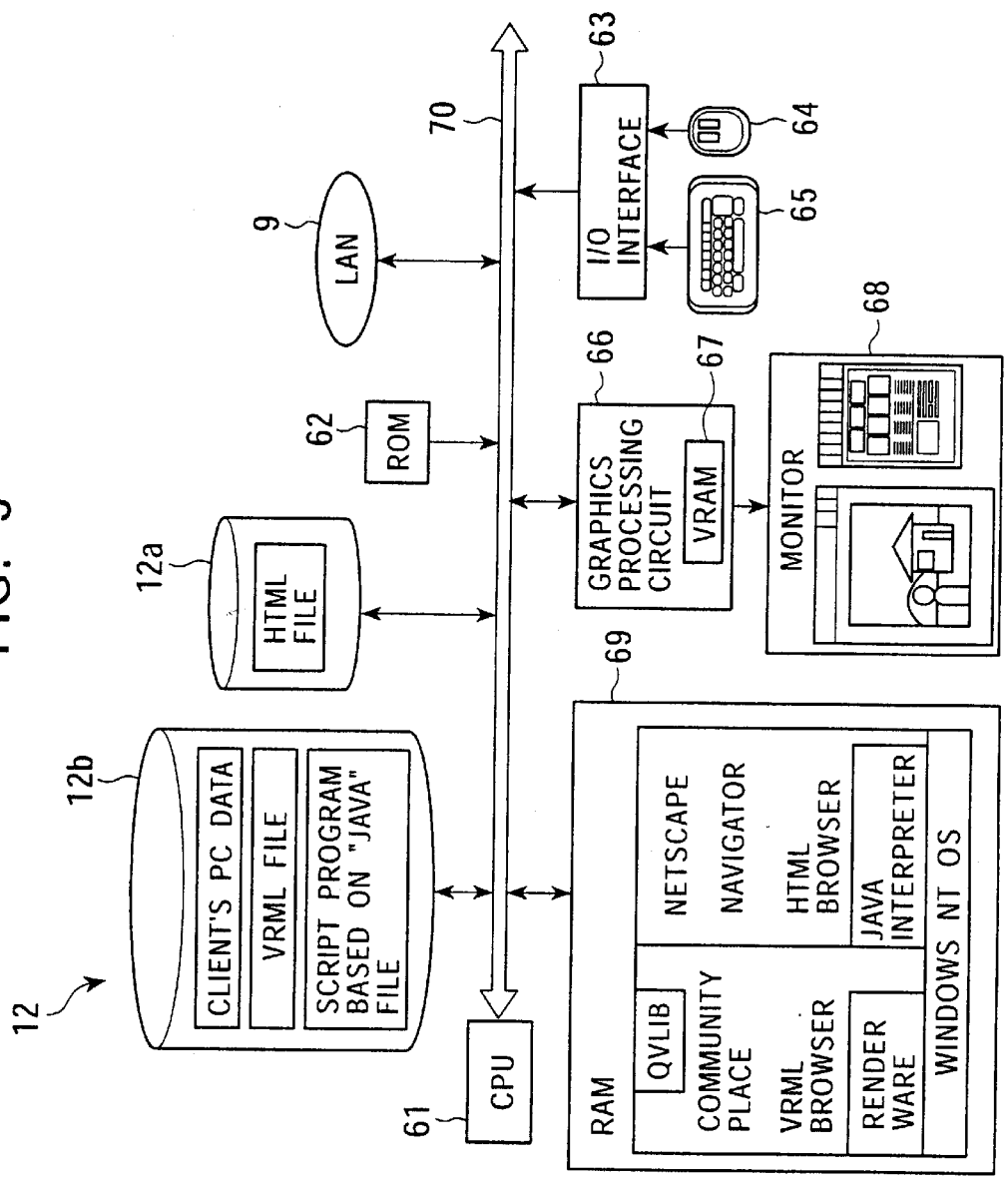
FIG. 3 is an overall schematic block diagram exemplifying a construction of a shared server 12 shown in FIG. 1.

FIG. 3 shows an overall schematic block diagram of hardware structure of the shared server 12. Basic structure of the hardware structure of the shared server 12 is identical to that of the client PC 1 shown in FIG. 2. More particularly, a hardware of the shared server 12 includes a CPU 61, a ROM 62, an I/O interface 63, a mouse 64, a keyboard 65, a graphics processing circuit 66, a VRAM 67, a monitor 68, a RAM 69, and a main bus line 70, which are respectively provided with such an operating function identical to that of corresponding components provided for the client PC 1 shown in FIG. 2 via identical names. However, a data-processing capacity of the CPU 61 and the graphics processing circuit 66 (including the VRAM 67) provided for the shared server 12 is arranged to be higher than that of the CPU 30 and the graphics processing circuit 44 of the client PC 1. In the present embodiment, the shared server 12 utilizes "Windows NT" (a registered trademark of Microsoft Inc., U.S.A.) as an operating system dealing with network services.

Further, a variety of data related to the client PC's 1–3 linked with each other via The Internet 7 are stored in a hard disc 12b of the shared server 12. The data related to the client PC's 1–3 includes specification of the CPU 30 for processing picture image data and other specification of the graphics processing circuit 43. For example, the data is respectively recorded based on data submitted by users at a time of concluding a contract with respective internet service providers. Based on the data related to the client PC's 1–3, and yet, based on a script program conforming to the "Java" interpreter, the shared server 12 processes picture image of the above-referred VRML file whenever dealing with the low-performance client PC's 2 and 3 incorporating a lower capability for processing picture image than that of the client PC 1. Then, the shared server 12 causes the WWW server 10 to output the processed picture image as pixel data via the satellite communication network 25. The server 12 also causes the WWW server 10 to output the VRML file to the client PC 1 incorporating higher capability for processing picture image via The Internet 7.

Figure 4:
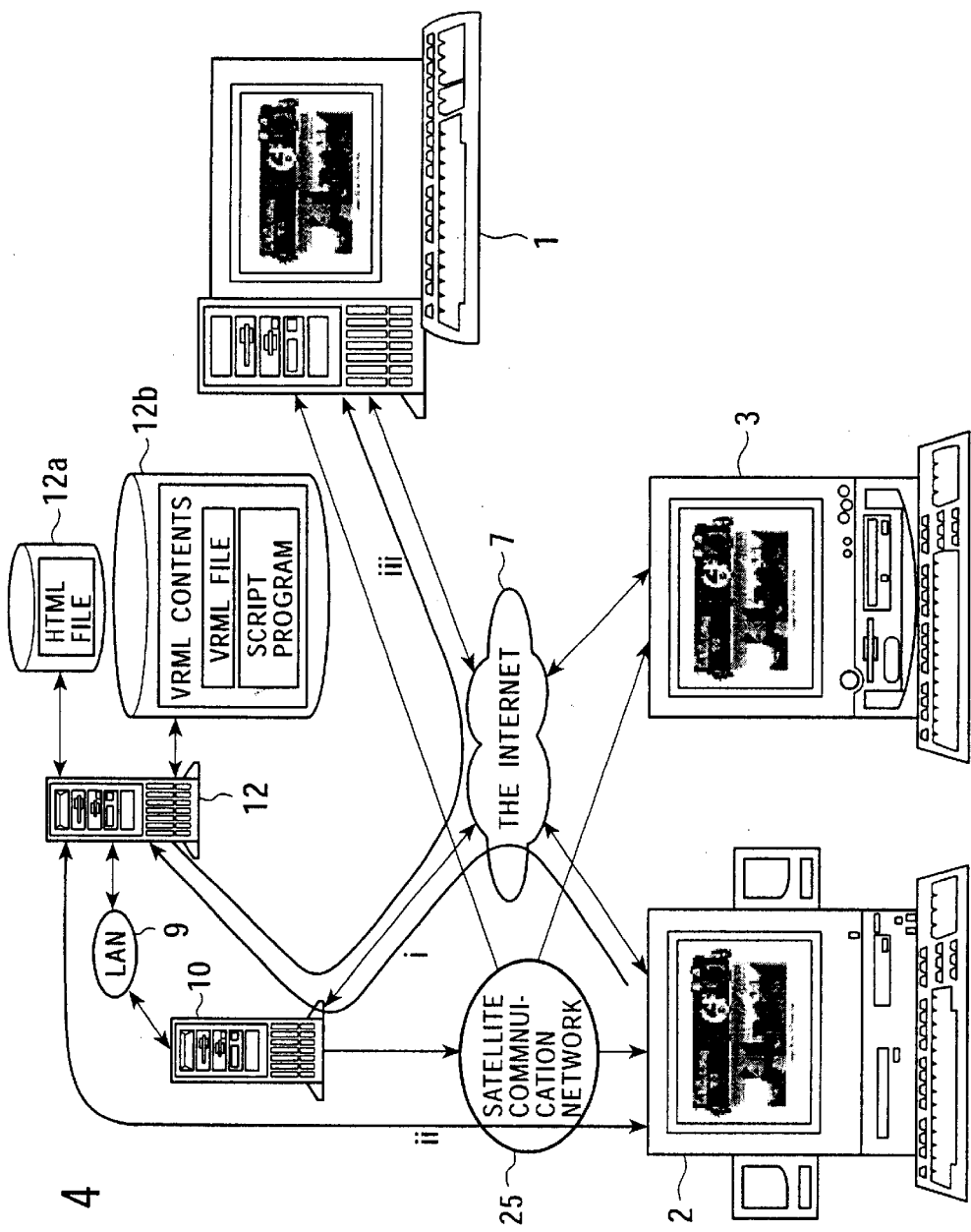
FIG. 4 is an overall block diagram explaining the picture-image data transmission paths.
Figure 5:
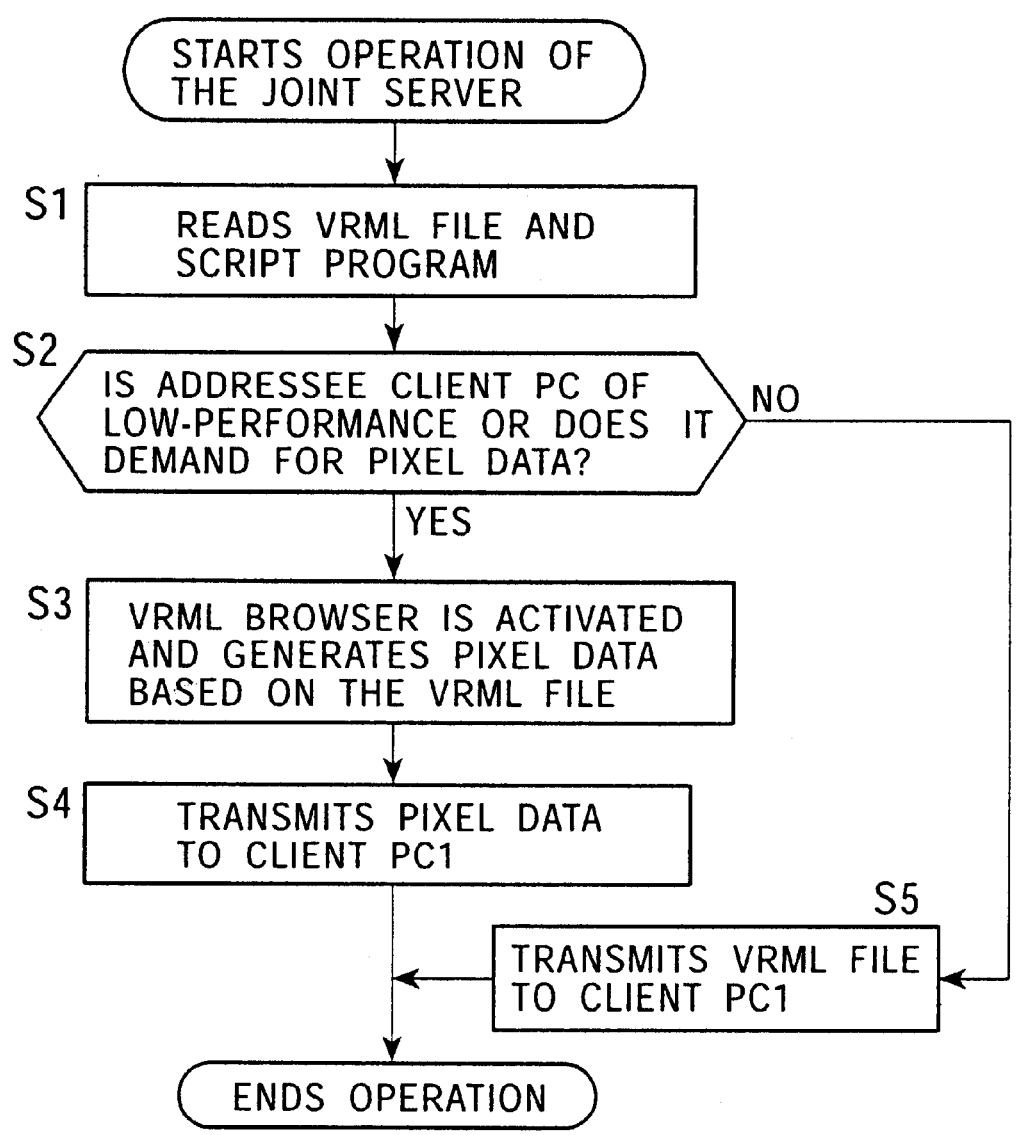
FIG. 5 is a flowchart explaining a process of picture-image data transmission via the shared server shown in FIG. 1.

Referring now to a conceptual block diagram shown in FIG. 4 and a flowchart shown in FIG. 5, processes executed by the shared server 12 for transmitting picture image data to the client PC's 1–3 are described below. A process is started whenever any of the client PC's 1–3 outputs a request for delivery of three-dimensional virtual reality spatial picture-image data against the shared server 12 via the WWW server 10 and The Internet 7. In the example, it is assumed that the client PC 2 outputs a request for delivery of the above data as shown in FIG. 4-(i).

When the initial step S1 is entered, in response to the above request, the CPU 61 of the shared server 12 causes the RAM 69 to internally read a VRML file storing the VRML contents and a script program stored in the HDD 12b.

Next, when the second step S2 is entered, the CPU 61 of the shared server 12 identifies, based on the client PC data stored in the HDD 12b, whether a specification of such client PC, which is a destination of a transmissible three-dimensional virtual reality spatial picture image, corresponds to a low-performance PC having less capability to process picture image or not. Yet, the CPU 61 further identifies whether the above client PC actually requests for delivery of pixel data in a practical format of picture image data or not. For example, when the CPU 61 of the shared server 12 is accessed by the client PC 2 or 3, based on the client PC data stored in the HDD 12b, the CPU 61 identifies that the request is generated by either of the low-performance client PC's 2 and 3, thereby proceeding to the third processing step S3.

When the third step S3 is entered, the CPU 61 activates operation of the "Community Place Browser" stored in the RAM 69, and then, based on the VRML file, the CPU 61 causes pixel data to be generated. Then, operating mode proceeds to the fourth step S4, in which, as shown in FIG. 4-(ii), the CPU 61 controls the WWW server 10 via LAN 9, and then transmits pixel data to the accessed client PC 2, for example via the satellite communication network 25, before completing the whole processing routine.

While the second step S2 is underway, for example, when the client PC 1 is identified as a destination of transmissible three-dimensional virtual reality spatial picture image, it is further identified whether transmission of picture-image data as pixel data is actually requested or not. If it is actually requested so, like in the above cases, processes corresponding to the steps S3 and S4 are sequentially executed.

Conversely, when the destination is identified to be the high-performance client PC 1 and yet no request is made for transmission of such pixel data, then, operating mode proceeds to the fifth step S5.

When the fifth step S5 is entered, as shown in FIG. 4-(iii), the CPU 61 of the shared server 12 transmits the VRML file stored in the HDD 12b to the high-performance client PC 1 via The Internet 7 to complete the processing routine.

Figure 6:
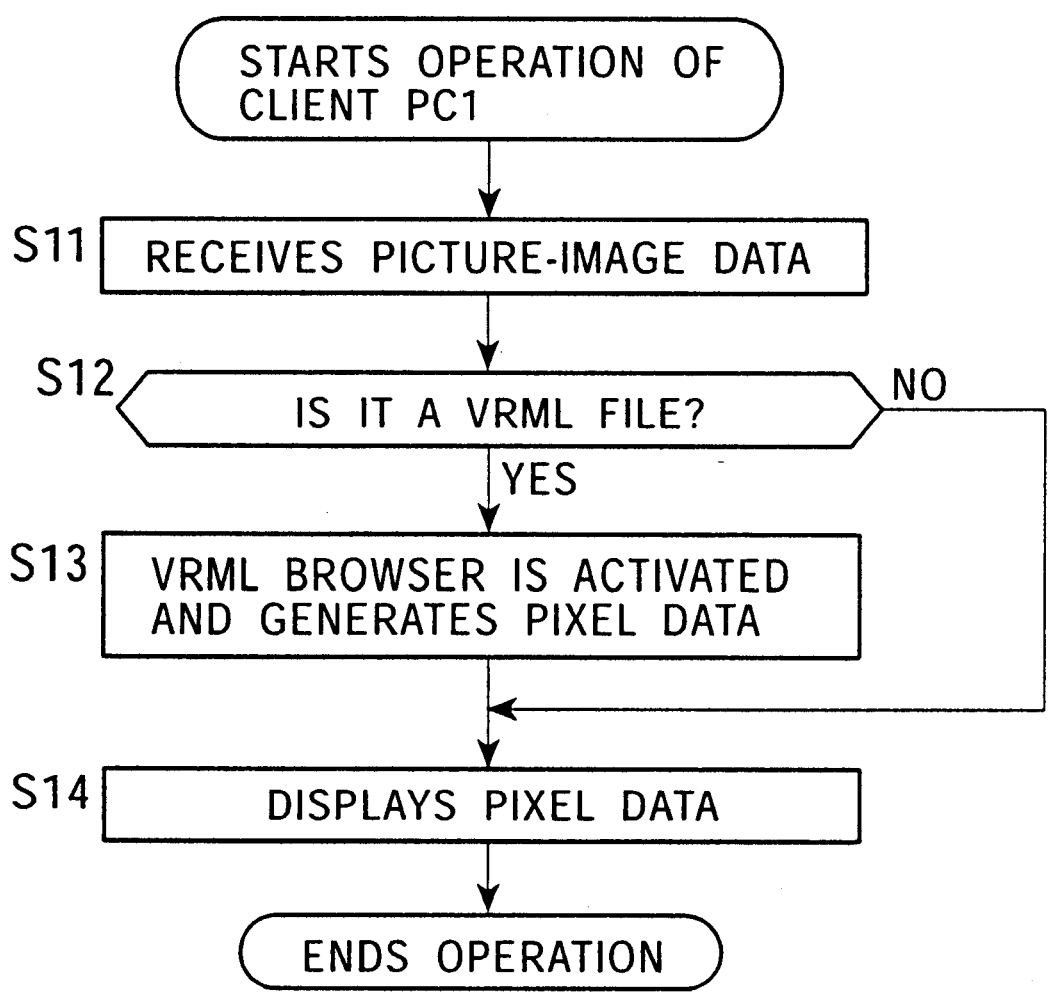
FIG. 6 is a flowchart explaining processes for receiving and displaying picture-image data via the client personal computer shown in FIG. 1.

Referring to a flowchart shown in FIG. 6, serial processes executed by the client PC's 1–3 in the course of receiving and displaying picture-image data are described below.

When the initial processing step S11 is entered, the CPU 30 of the client PC 1 receives picture image data transmitted from the shared server 12, and then stores the received data in the HDD 31. As described above, when picture image data is transmitted as pixel data, the data is received via the satellite signal receiving apparatus 39b. On the other hand, when picture image data is transmitted as a VRML file, the data is received via the modem 39a. When step S12 is entered, the CPU 30 identifies whether the received picture image data corresponds to a VRML file or not. If the received picture image data is identified as a VRML file, then operating mode proceeds to the following step S13.

When the processing step S13 is entered, the CPU 30 of the high-performance client PC 1 activates operation of the "Community Place Browser" (i.e., the VRML browser), and then, based on a script program, the CPU 30 processes picture image of the VRML file stored in the HDD 31 and generates three-dimensional virtual reality spatial picture image pixel data.

When the processing step S14 is entered, the CPU 30 causes the pixel data generated based on the VRML file to be displayed on the monitor 45 to complete the processing routine.

While the second step S12 is underway, if it is identified that the received picture image data does not correspond to the VRML file. In other words, if the received picture image data is identified as pixel data, the processing operation in the S13 is skipped to proceed to the step S14, in which a process for displaying the received pixel data on the monitor 45 is executed. This processing operation is executed by the low-performance client PC 2 or 3. Alternatively, this processing operation is executed by the high-performance client PC 1 whenever transmission of pixel data is requested.

In the above description, other than causing the CPU 61 of the shared server 12 to identify a format of picture image data to be transmitted, based on the client PC data stored in the hard disc 12b, it is arranged so that the format of the picture image data to be transmitted can be solely selected by the high-performance client PC 1. However, it is also possible for the low-performance client PC 2 or 3 to optionally specify the format of picture-image data to be transmitted. In such case, because of the relatively low capability of the PC 2 or 3 to process a picture image, even though the client PC 2 or 3 incorporates such a function to generate pixel data based on the VRML file, time for processing the picture image becomes longer, and thus, it may not be possible for the client PC 2 or 3 to display a three-dimensional virtual reality spatial picture image at real-time speed.

Moreover, it is possible for the high-performance client PC 1 to cause an "avatar" image to be transferred to a specific position within a three-dimensional virtual reality space, whereas it is possible for the remaining client PC's 2 and 3 to recognize such an "avatar" image as part of a picture image in three-dimensional virtual reality space.

On the other hand, it is assumed that such picture-image data to be delivered to the low-performance client PC's 2 or 3 as pixel data corresponds to such picture image as viewed from a specific visual (fixed) point within the three-dimensional virtual reality space. Accordingly, it is not possible for the low-performance client PC's 2 or 3 to effect display by way of changing the visual point, so they only display the picture image as if being photographed from a fixed point. However, it is possible to shift the visual point by way of setting a fixed point at a number of positions within the three-dimensional virtual reality space to enable the client PC 2 or 3 to select a specific fixed point.

Although the above description is referred to the VRML file as three-dimensional virtual reality spatial picture image data, it is also possible to utilize other picture image data. Further, although the above description refers to the satellite communication network 25 as an example for transmitting picture image of pixel data, it is allowable to utilize any high-speed communication facility such as a CATV (cable television) service line.

The above description has further referred to the case in which client PC's are activated to display three-dimensional virtual reality spatial picture image. However, in order to transmit a picture image via the satellite communication network 25, it is possible to display a three-dimensional virtual reality spatial picture image not only through a client PC but also by setting a receiving apparatus compatible with high-speed picture image transmission such as a conventional TV set.

Further, the above embodiment is arranged so that specification of the client PC's is stored as client PC data. However, it is also practicable to store actual status of payment of a predetermined chargeable amount so that, depending on the payment condition, selection of picture image data can be allowed or prohibited from the client PC side.

According to the above-described construction, the WWW server causes three-dimensional virtual reality spatial picture image data to be processed in correspondence with a capability of a client PC of processing picture image before transmitting the picture image data. Accordingly, it is possible to display a homogenous picture image on a monitor of a client PC incorporating such a capability for processing a variety of picture images at real-time speed.

The above-described processes can be executed by applying hardware. However, it is also possible to execute the above processes by applying software. When executing the above serial processes via software, programs for constituting the software are installed from a storage medium into such a computer integrated in an exclusive hardware or such a general-purpose PC capable of executing a variety of functional operations via a variety of programs previously installed therein.

The storage medium may be provided to a user in a condition in which such medium is previously built in the client PC 1 as shown in FIG. 2. Not only the HDD 31 recorded with programs, but, independent of the computer, any storage medium related to the present invention may include a package media including a magnetic disc 101 (including a "floppy" disc [a registered trademark of Hitachi Corporation]) recorded with programs, an optical disc 102 including a CD-ROM (compact-disc read-only-memory) and a DVD (digital versatile disc), an opto-magnetic disc 103 (including a mini-disc MD), a semiconductor memory 104 or any storage or data recording medium available for providing the user with a variety of data or programs.

It should be understood that, in this specification, those steps for describing programs recorded on each of the above storage media include those processes to be executed in conformity with time sequence and in accordance with the described sequence and also those processes executed in parallel or in an individual basis even though those processes are not executed in conformity with time sequence.

Moreover, it also should be understood that the term "system" described in the present specification indicates a totality of apparatuses constituted by a plurality of apparatuses.

Although the present invention has been described with reference to specific embodiments, those of skill in the art will recognize that changes may be made thereto without departing from the spirit and scope of the invention as set forth in the hereafter appended claims.

I claim:

1. A data processing apparatus providing three-dimensional virtual reality space for another data processing apparatus linked to a network, the data processing apparatus comprising:

a generating part for generating pixel data of the three-dimensional virtual reality spatial picture image from three-dimensional virtual reality spatial data; and a transmitting part for transmitting the three-dimensional virtual reality spatial pixel data generated by the generating part to the another data processing apparatus.

2. A data processing apparatus as claimed in claim 1, wherein the generating part generates pixel data of the picture image including an avatar image controlled by the another data processing apparatus.

3. A data processing apparatus as claimed in claim 1, wherein the generating part generates the pixel data of the picture image captured from a fixed point in the three-dimensional virtual reality space.

4. A data processing apparatus as claimed in claim 1, wherein the transmitting part transmits pixel data of the three-dimensional virtual reality spatial picture image via a satellite communication network.

5. A method for processing data used by a data processing apparatus, wherein the data processing apparatus provides three-dimensional virtual reality space for another data processing apparatus linked to a network, the method comprising the steps of:

generating pixel data of the three-dimensional virtual reality spatial picture image from three-dimensional virtual reality spatial data; and controlling transmission of the three-dimensional virtual reality spatial pixel data generated via the step of generating to the another data processing apparatus.

6. A medium provided with a program, wherein the program can be read by a computer and is used for controlling a data processing apparatus, wherein the data processing apparatus provides three-dimensional virtual reality space to another data processing apparatus linked via a network, and wherein the program comprises:

a generating part for generating pixel data of the three-dimensional virtual reality spatial picture image from three-dimensional virtual reality spatial data; and a transmission controlling part for controlling transmission of the three-dimensional virtual reality spatial picture image generated via the generating part to the another data processing apparatus.

7. A data processing apparatus displaying a three-dimensional virtual reality spatial picture image, wherein the data processing apparatus, linked to another data processing apparatus via a network, comprises:

a receiving part for receiving pixel data of the three-dimensional virtual reality spatial picture image represented by three-dimensional virtual reality spatial data from the another data processing apparatus; and a displaying part for displaying the pixel data received by the receiving part.

8. A data processing apparatus as claimed in claim 7, wherein the receiving part receives the pixel data of the three-dimensional virtual reality spatial picture image via a satellite communication network.

9. A method for processing data used by a data processing apparatus, wherein the data processing apparatus displays a three-dimensional virtual reality spatial picture image and is linked with another data processing apparatus via a network, the method comprising the steps of:

controlling reception of pixel data of the three-dimensional virtual reality spatial picture image represented by three-dimensional virtual reality spatial data from the another data processing apparatus; and controlling display of the pixel data received via a process for executing the reception controlling step.

10. A storage medium recorded with a program that can be read by a computer, wherein the program displays a three-dimensional virtual reality spatial picture image and is used for controlling a data processing apparatus linked with another data processing apparatus via a network, the program comprising:

a reception controlling step for controlling reception of pixel data of the three-dimensional virtual reality spatial picture image represented by three-dimensional virtual reality spatial data from the another data processing apparatuses; and a display controlling step for controlling display of the pixel data received via a process for executing the reception controlling step.

11. A data processing system, comprising:

a first data processing apparatus providing three-dimensional virtual reality space for a second data processing apparatus linked via a network; and the second data processing apparatus displaying three-dimensional virtual reality spatial picture image, wherein the second data processing apparatus is linked with the first data processing apparatus via a network, wherein the first data processing apparatus comprises:

a generating part for generating pixel data of the three-dimensional virtual reality spatial picture image from three-dimensional virtual reality spatial data; and a transmitting part for transmitting the pixel data of the three-dimensional virtual reality spatial picture image generated by the generating part to the second data processing apparatus; and wherein the second data processing apparatus comprises:

a receiving part for receiving pixel data of the three-dimensional virtual reality spatial picture image from the first data processing apparatus; and a displaying part for displaying the pixel data received via the receiving part.

12. A data processing apparatus as claimed in claim 11, wherein the transmitting part and the receiving part transmit and receive pixel data of the three-dimensional virtual reality spatial picture image via a satellite communication network.

13. A method for processing data used by a data processing system, wherein the data processing system includes a first data processing apparatus and a second data processing apparatus, wherein the first data processing apparatus providing a three-dimensional virtual reality space to the second data processing apparatus is linked to a network and the second data processing apparatus displaying the three-dimensional virtual reality spatial picture image is linked with the first data processing apparatus via the network, wherein said processing method, executed by the first data processing apparatus, comprises the steps of:

generating pixel data of the three-dimensional virtual reality spatial picture image from three-dimensional virtual reality spatial data; and controlling transmission of the pixel data of the three-dimensional virtual reality spatial picture image generated via a process executed by the step of generating; and the data processing method, executed by the second data processing apparatus, comprises the steps of:

controlling reception of pixel data of the three-dimensional virtual reality spatial picture image from the first data processing apparatus; and a display controlling step for controlling display of the pixel data received via a process executed by the reception controlling step.

14. A storage medium recorded with a program that can be read by a computer and used for controlling a data processing system, wherein the data processing system includes a first data processing apparatus and a second data processing apparatus, wherein the first data processing apparatus provides a three-dimensional virtual reality space to the second data processing apparatus and the second data processing apparatus displays a three-dimensional virtual reality spatial picture image and is linked to a network, wherein the program used for controlling the first data processing apparatus comprises:

a generating step for generating pixel data of the three-dimensional virtual reality spatial picture image from three-dimensional virtual reality spatial data; and a transmission controlling step for controlling transmission of the pixel data of the three-dimensional virtual reality picture image generated via a process executed by the generating step to the second data processing apparatus; and the program controlling the second data processing apparatus comprises:

a reception controlling step for controlling reception of pixel data of the three-dimensional virtual reality spatial picture image from the first data processing apparatus; and a display controlling step for controlling display of the pixel data received via a process executed by the reception controlling step.

15. A data processing apparatus providing three-dimensional virtual reality space for another data processing apparatus via a network, the data processing apparatus comprising:

a generating part for generating pixel data of the three-dimensional virtual reality spatial picture image from three-dimensional virtual reality spatial data;

an identifying part for identifying whether the data processing apparatus itself or the second data processing apparatus is to generate the pixel data of the three-dimensional virtual reality spatial picture image; and a transmitting part for transmitting such data required for generating one of the three-dimensional virtual reality spatial picture image, and the pixel data to the another data processing apparatus in response to an identified result drawn by the identifying part.

16. A data processing apparatus as claimed in claim 15, further comprising:

a storage part for storing data related to the another data processing apparatus.

17. A data processing apparatus as claimed in claim 16, wherein the identifying part executes an identifying operation based on one of data related to another data processing apparatus stored in the storage part, and a request from the another data processing apparatus.

18. A data processing apparatus as claimed in claim 15, wherein the transmitting part transmits pixel data of the three-dimensional virtual reality spatial picture image via a satellite communication network.

19. A method for processing data used for a data processing apparatus, wherein the data processing apparatus provides a three-dimensional virtual reality space to another data processing apparatus via a network, the method comprising the steps of:

generating pixel data of the three-dimensional virtual reality spatial picture image from three-dimensional virtual reality spatial data;

identifying whether the data processing apparatus itself or the second data processing apparatus is to generate the pixel data of the three-dimensional virtual reality spatial picture image; and controlling transmission of data required for generating one of the three-dimensional virtual reality spatial picture image and the pixel data in response to an identified result drawn by the identifying part.

20. A storage medium recorded with a program that can be read by a computer, wherein the program is used for controlling a data processing apparatus providing three-dimensional virtual reality space to another data processing apparatus via a network, and wherein the program used for controlling the data processing apparatus comprises:

a generating step for generating pixel data of the three-dimensional virtual reality spatial picture image from three-dimensional virtual reality spatial data;

an identifying step for identifying whether the data processing apparatus itself or the second data processing apparatus is to generate the pixel data of the three-dimensional virtual reality spatial picture image; and a transmission controlling step for controlling transmission of data required for generating one of the three-dimensional virtual reality spatial picture image and the pixel data to the another data processing apparatus in response to an identified result drawn by the identifying step.

21. A data processing apparatus displaying a three-dimensional virtual reality spatial picture image delivered from another data processing apparatus via a network, wherein the data processing apparatus comprises:

a requesting part for requesting delivery of a practical format of the three-dimensional virtual reality spatial picture image against the another data processing apparatus;

a receiving part for receiving data required for generating the three dimensional virtual reality spatial picture image from three-dimensional virtual reality spatial data or pixel data of the three-dimensional virtual reality spatial picture image in response to a request delivered from the requesting part;

a generating part for generating pixel data of the three-dimensional virtual reality spatial picture image based on data received via the receiving part; and a displaying part for displaying one of the pixel data of the three-dimensional virtual reality spatial picture image received via the receiving part and pixel data of the three-dimensional virtual reality spatial picture image generated by the generating part.

22. A data processing apparatus as claimed in claim 21, wherein the receiving part receives pixel data of the three-dimensional virtual reality spatial picture image via a satellite communication network.

23. A method for processing data used by a data processing apparatus displaying a three-dimensional virtual reality spatial picture image delivered from another data processing apparatus via a network, the method comprising the steps of:

controlling a request made against the another data processing apparatus for delivery of a certain format of the three-dimensional virtual reality spatial picture image;

controlling one of reception of data required for generating the three-dimensional virtual reality spatial picture image from three-dimensional virtual reality spatial data in response to a request made via a process executed by the reception controlling step, and reception of pixel data of the three-dimensional virtual reality spatial picture image;

generating pixel data of the three-dimensional virtual reality spatial picture image based on the data received via a process executed by the reception controlling step; and controlling display of one of pixel data of the three-dimensional virtual reality spatial picture image received via a process executed by the reception controlling step, and pixel data of the three-dimensional virtual reality spatial picture image generated via a process executed by the generating step.

24. A storage medium recorded with a program, wherein the program can be read by a computer and is used for controlling a data processing apparatus displaying a three-dimensional virtual reality spatial picture image delivered from another data processing apparatus via a network, wherein the program comprises:

a request controlling step for controlling a request made against the another data processing apparatus for delivery of a certain format of three-dimensional virtual reality spatial picture image;

a reception controlling step for controlling one of reception of data required for generating the three-dimensional virtual reality spatial picture image from three-dimensional virtual reality spatial data in response to a request made via a process executed by the request-controlling step, and reception of pixel data of the three-dimensional virtual reality spatial picture image;

a generating step for generating pixel data of the three-dimensional virtual reality spatial picture image based on the data received via a process executed by the reception controlling step; and a display controlling step for controlling one of display of the pixel data of the three dimensional virtual reality spatial picture image received via a process executed by the reception controlling step, and display of pixel data of the three-dimensional virtual reality spatial picture image generated via a process executed by the generating step.

25. A data processing system comprising a first data processing apparatus providing three-dimensional virtual reality space to a second data processing apparatuses via a network, and the second data processing apparatus displaying a three-dimensional virtual reality spatial picture image delivered from the first data processing apparatus via a network, wherein the first data processing apparatus comprises:

a generating part for generating pixel data of the three dimensional virtual reality spatial picture image from three-dimensional virtual reality spatial data;

an identifying part for identifying whether the data processing apparatus itself or the second data processing apparatus is to generate the pixel data of the three-dimensional virtual reality spatial picture image; and a transmitting part for transmitting data required for generating one of the three-dimensional virtual reality spatial picture image in response to an identified result drawn by the identifying part, and the pixel data to the second data processing apparatus; and the second data processing apparatus comprises:

a requesting part for requesting the first data processing apparatus for delivery of a certain format of the three-dimensional virtual reality spatial picture image;

a receiving part for receiving one of data required for generating the three-dimensional virtual reality picture image from three-dimensional virtual reality spatial data in response to a request made by the requesting part, and pixel data of the three-dimensional virtual reality spatial picture image;

a generating part for generating pixel data of the three-dimensional virtual reality spatial picture image based on the data received via the receiving part; and a displaying part for displaying one of a pixel data of the three-dimensional virtual reality spatial picture image received via the receiving part, and the pixel data of the three-dimensional virtual reality spatial picture image generated by the generating part.

26. A data processing system as claimed in claim 25, wherein the transmitting part and the receiving part individually transmit and receive pixel data of the three-dimensional virtual reality spatial picture image via a satellite communication network.

27. A method for processing data used by a data processing system comprising a first data processing apparatus and a second data processing apparatus, wherein the first data processing apparatus provides three-dimensional virtual reality space for the second data processing apparatus via a network and the second data processing apparatus displays three-dimensional virtual reality spatial picture image delivered from the first data processing apparatus via a network, wherein the data processing method executed by the first data processing apparatus comprises the steps of:

generating a pixel data of the three-dimensional virtual reality spatial picture image from three-dimensional virtual reality spatial data;

identifying whether the data processing apparatus itself or the second data processing apparatus is to generate the pixel data of the three-dimensional virtual reality spatial picture image; and controlling transmission of data required for generating one of the three-dimensional virtual reality spatial picture image and the pixel data to the second data processing apparatus in response to an identified result drawn via a process for executing the identifying step; and the data processing method executed by the second data processing apparatus comprises the steps of:

controlling a request made against the first data processing apparatus for delivery of a certain format of three-dimensional virtual reality spatial picture image;

controlling reception of data required for generating the three-dimensional virtual reality spatial picture image from three-dimensional virtual reality spatial data in response to a request made via a process for executing the request controlling step;

generating pixel data of the three-dimensional virtual reality spatial picture image based on the data received via a process for executing the reception controlling step; and controlling display of one of a pixel data of the three-dimensional virtual reality spatial picture image received via a process for executing the reception controlling step, and pixel data of the three-dimensional virtual reality spatial picture image generated via a process for executing the generating step.

28. A storage medium recorded with a program, wherein the program can be read by a computer and the computer can be used for controlling a data processing system comprising a first data processing apparatus and a second data processing apparatus, wherein the first data processing apparatus provides three-dimensional virtual reality space to the second data processing apparatus via a network and the second data processing apparatus displays a three-dimensional virtual reality spatial picture image delivered from the first data processing apparatus via a network, wherein the program used for the first data processing apparatus comprises:

a generating step for generating pixel data of the three-dimensional virtual reality spatial picture image from three-dimensional virtual reality spatial data;

an identifying step for identifying whether the data processing apparatus itself or the second data processing apparatus is to generate the pixel data of the three-dimensional virtual reality spatial picture image; and a transmission controlling step for controlling transmission of one of data required for generating the three-dimensional virtual reality spatial picture image in response to an identified result drawn via a process for executing the identifying step, and the pixel data to the second data processing apparatus; and the program used by the second data processing apparatus comprises:

a request controlling step for controlling a request to be made against the first data processing apparatus for delivery of a certain format of three-dimensional virtual reality picture image;

a reception controlling step for controlling reception of data required for generating the three-dimensional virtual reality spatial picture image from three-dimensional virtual reality spatial data in response to a request made via a process for executing the request controlling step;

a generating step for generating pixel data of the three-dimensional virtual reality spatial picture image based on the data received via a process for executing the reception controlling step; and a display controlling step for controlling one of display of pixel data of the three-dimensional virtual reality spatial picture image received via a process for executing the reception controlling step, and display of pixel data of the three-dimensional virtual reality spatial picture image generated via a process for executing the generating step.

* * * * *